United States Patent
Novin et al.

(10) Patent No.: US 6,588,062 B2
(45) Date of Patent: Jul. 8, 2003

(54) SPRING LOADED POP-UP FRICTION HINGE ASSEMBLY

(75) Inventors: Eugene Novin, Ambler, PA (US); David A. Lowry, Wayne, PA (US)

(73) Assignee: CEMA Technologies, Inc., Audubon, PA (US)

( * ) Notice: Subject to any disclaimer, the term of this patent is extended or adjusted under 35 U.S.C. 154(b) by 0 days.

(21) Appl. No.: 09/950,342

(22) Filed: Sep. 11, 2001

(65) Prior Publication Data

US 2003/0046793 A1 Mar. 13, 2003

(51) Int. Cl.⁷ ............................ E05C 17/64; E05D 11/08
(52) U.S. Cl. ............................ 16/342; 16/338; 16/357; 16/374
(58) Field of Search .................... 16/342, 337, 338, 16/322, 267, 355, 340, 356, 357, 361, 300, 301, 374, 381; 361/681, 682

(56) References Cited

U.S. PATENT DOCUMENTS

| | | | |
|---|---|---|---|
| 4,419,788 A | * 12/1983 | Prout | 16/300 |
| 4,734,955 A | 4/1988 | Connor | |
| 5,231,734 A | 8/1993 | Rude | |
| 5,406,678 A | 4/1995 | Rude et al. | |
| 5,632,066 A | * 5/1997 | Huong | 16/338 |
| 5,832,566 A | 11/1998 | Quek et al. | |
| 5,943,738 A | * 8/1999 | Karfiol | 16/342 |
| 5,966,776 A | 10/1999 | Ona | |
| 6,035,491 A | 3/2000 | Hartigan et al. | |
| 6,101,676 A | 8/2000 | Wahl et al. | |
| 6,170,120 B1 | * 1/2001 | Lu | 16/331 |
| 6,178,598 B1 | 1/2001 | Creely, III et al. | |
| 6,230,365 B1 | * 5/2001 | Lu | 16/16 |

FOREIGN PATENT DOCUMENTS

| | | | |
|---|---|---|---|
| JP | 406159347 A | * | 6/1994 |
| JP | 10047337 A | * | 2/1998 |
| JP | 411247840 A | * | 9/1999 |
| WO | WO 95/16094 | * | 6/1995 |

* cited by examiner

Primary Examiner—Chuck Y. Mah
(74) Attorney, Agent, or Firm—Akin Gump Strauss Hauer & Feld, L.L.P.

(57) ABSTRACT

A hinge assembly for rotatably coupling a first member to a second member. A cylindrical pintle is secured to the second member. A friction element secured to the first member includes first and second cylindrical walls that wrap at least substantially circumferentially around the pintle in opposing first and second directions, respectively, providing equal resistance to relative rotation therebetween in both directions. A protuberance extends radially from the pintle, into a corresponding slot in at least one of the cylindrical walls, and engages an end of the slot when the first member and second member achieve a first predefined angular relationship, the friction element storing energy from relative movement between the friction element and pintle when the protuberance is engaged at the slot end.

10 Claims, 8 Drawing Sheets

SPRING LOADED POP-UP FRICTION HINGE ASSEMBLY

BACKGROUND OF THE INVENTION

The present invention relates generally to a hinge assembly for rotatably coupling a first member to a second member and, more particularly, to a hinge assembly having a pre-loadable friction element which controls and influences the angular position of the first member with respect to the second member.

It is often necessary to control the angular position of a first member which is rotatably coupled to a second member by a hinge. Such control is often economically and efficiently provided by employing one or more friction hinges. Friction hinges are well known and are disclosed in U.S. Pat. Nos. 5,491,874 and 5,752,293, which are incorporated herein by reference. Friction hinges are particularly well suited for "clamshell" devices such as laptop or notebook computers, personal digital assistants, and other hand-held devices having a similar two-part configuration where a cover or display screen rotates relative to a keyboard or the like. Friction hinges permit a user to position the display screen or cover relative to the keyboard, cover, etc. and maintain the relative rotational position of the two parts. In a laptop computer, for example, the display screen rotates from a closed position wherein the screen is in face-to-face mating engagement with the keyboard to an open position where the display screen is positioned generally within a range from about perpendicular to the keyboard to approximately one hundred thirty-five degrees with respect to the keyboard. In such a configuration the friction element of the hinge is normally structurally fastened to the base of the computer and the shaft is connected to the display screen. When the display screen is rotated about the axis created by the hinges, it is held in a desired angular position by the force generated between the friction element(s) or member and the pintle or shaft.

Many other applications exist for such friction hinges. For example, in many automobiles of recent vintage a pivotable display screen is provided for viewing of pre-recorded video or for display of video games. Such display screens are often interior roof-mounted and rotate from a closed position wherein the display screen is generally parallel to the roof of the vehicle to an open position directed toward the viewer. Due to the variety of sizes of viewers and positions for viewing within the automobile it is often necessary to change the angle of the display screen with respect to a closed position. In such applications, friction hinges provide an inexpensive and convenient mechanism for maintaining the display screen in a desired orientation.

One drawback to standard friction hinges is that, in a given direction of rotation, such hinges apply generally uniform resisting force throughout their rotational range to movement of the first and second members relatively to one another. Thus, uniform resistive force is applied to each by the hinge from the closed position to the full open position and vice-versa. The result of this, when one considers the closed position, is that the user must exert significant force to separate the two halves of the device. In other words, once a retaining catch or similar retention feature that maintains the two halves of the clamshell-type device in a closed position is released, the user must engage one or more fingers on what is usually a very small gripping feature and separate the two halves of the device against a significant resistive force applied by the friction hinge. This act can be difficult due to the resistance to rotation built into the friction hinge and also due to the force of gravity where a cover or display panel must be rotated upwardly with respect to the lower half of the device, such as in a laptop or notebook computer. The hinge assembly of the present invention provides an initial lift or "pop-up" from the closed position to facilitate opening the clamshell device.

Another drawback to prior art friction hinge designs is that the resistance to rotation provided by the interaction between the friction member and the pintle or shaft differs, depending on the rotational direction of the friction member with respect to the pintle or shaft. When the pintle rotates in a direction counter to the direction of wrap of the friction member around the pintle, the resistive force is lower than when the pintle rotates in the opposite direction with respect to the friction member. When a prior art friction hinge assembly is installed in, for example, a laptop computer, the hinge assembly is configured such that the lesser resistive force is encountered when moving the display portion and keyboard portion toward the closed position and the greater resistive force is encountered when moving the display portion and keyboard portion toward the open position. In configuring the hinge assembly for such a device, the resistive force is predefined so as to prevent the display portion from moving toward a closed position with respect to the keyboard portion solely from the force of gravity. The drawback to this configuration is that when the keyboard portion of the laptop is resting on a desktop, the increased resistive force encountered in moving the display portion from the closed position to the open position may cause the keyboard to lift off the desktop due to the relatively greater resistive force encountered in opening the device. Given the respective weights of the display and keyboard portions of current laptop computer designs, it is desirable to have a hinge assembly that provides not only the initial lift described above, but also equal resistance to rotation in both directions so as to eliminate lifting the keyboard portion off the desktop when moving the display portion from a closed position to an open position with respect to the keyboard portion.

The present invention overcomes many of the disadvantages inherent in the conventional friction hinge assembly by providing a friction hinge that gives the designer the option of creating equal resistive forces in both rotational directions. The present invention also overcomes such disadvantages by providing a pre-load that assists in urging the friction element and pintle or shaft from a predetermined angular position so as to, for example, assist in separating the halves of a clamshell-type device.

BRIEF SUMMARY OF THE INVENTION

A hinge assembly for rotatably coupling a first member to a second member. A pintle is secured to the second member and includes a cylindrical external surface having a first longitudinal portion and a second longitudinal portion. A friction element is secured to the first member and includes a first cylindrical wall wrapping at least substantially circumferentially around the first longitudinal portion of the pintle in a first circumferential direction. The first cylindrical wall is configured to provide an interference fit with the pintle such that the first cylindrical wall applies a first generally radially directed compressive force to the pintle. The friction element further includes a second cylindrical wall wrapping at least substantially circumferentially around the second longitudinal portion of the pintle in a second circumferential direction. The second circumferential direction is opposed to the first circumferential direction. The second cylindrical wall is configured to provide an interference fit with the pintle such that the second cylindrical wall applies a second generally radially directed compressive force to the pintle.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 2:
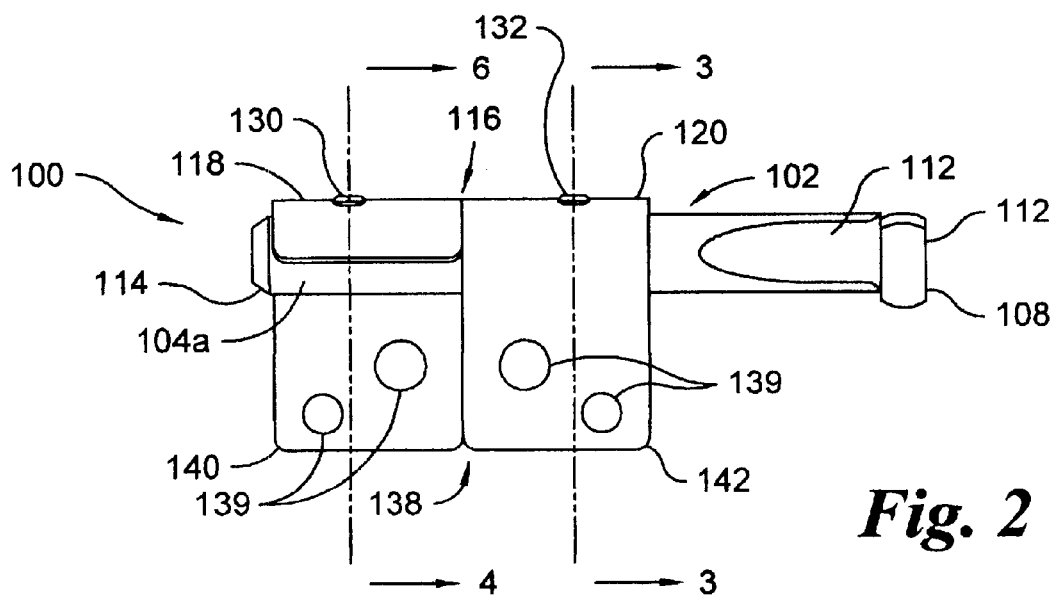
FIG. 2 is a top plan view of the hinge assembly shown in FIG. 1.

Referring to the drawings in detail, wherein like numerals indicate like elements throughout, there is shown in FIGS. 1–9 a preferred embodiment of a pre-loadable hinge assembly, generally designated 100, for rotatably coupling a first member (not shown) to a second member (not shown) in accordance with the present invention. The present invention is not limited to rotatably coupling any particular type of first member to a second member or to any particular method of securing the first and second members to the hinge assembly. As stated above, the pre-loadable hinge assembly 100 is particularly well suited for "clamshell" devices (not shown) such as laptop computers and personal digital assistants and reference will be made to a laptop computer for purposes of convenience and illustration only and is not intended to be limiting as to application or function of the hinge assembly 100.

Figure 1:
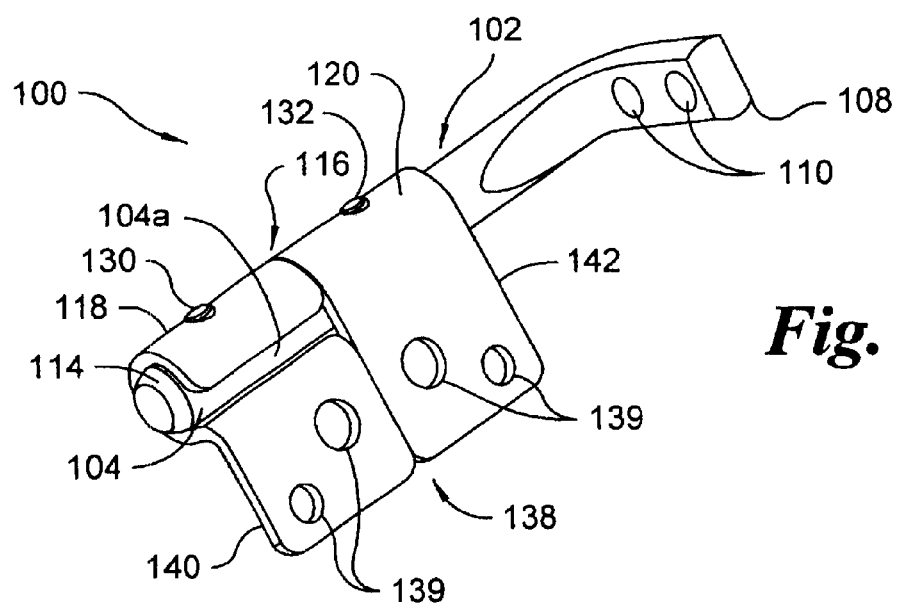
FIG. 1 is a perspective view of a hinge assembly in accordance with a preferred embodiment of the present invention.

Referring primarily to FIGS. 1 and 2, and secondarily to FIGS. 3–9, the hinge assembly 100 includes a pintle 102 for being secured to a second member (not shown). The pintle 102 includes a generally cylindrical external surface 104 having a first longitudinal portion 104a and a second longitudinal portion 104b. The pintle 102 further includes a mounting tab 108 for attachment to the second member. The mounting tab 108 preferably is oriented at an angle of approximately ninety degrees with respect to the first and second longitudinal portions 104a, b of the mounting tab 108 and preferably includes a plurality of mounting holes 110 for attachment to the second member. For purposes of facilitating connection to the second member, the mounting tab 108 preferably includes opposed flat surfaces 112, which provide for more secure engagement with fasteners (not shown) and with the mounting surface of the second member. It should be noted that virtually any structure known to those skilled in the art may be used to fix the pintle 102 to the second member, the selection merely being a matter of design choice. For example, instead of the mounting tab 108, the pintle 102 could include a splined connection (not shown). In the preferred embodiment, the mounting tab 108 is oriented generally perpendicular to the first and second longitudinal portions 104a, b of the pintle 102, but may be oriented otherwise, such as axially (i.e., co-axially with the longitudinal portions 104a, b) without departing from the spirit and scope of the invention. The pintle 102 also preferably includes a chamfered leading edge 114 to facilitate assembly, as discussed more fully below. The pintle 102 preferably is made from steel or another hard, durable material, but other materials may be used without departing from the scope of the invention.

Figure 3:
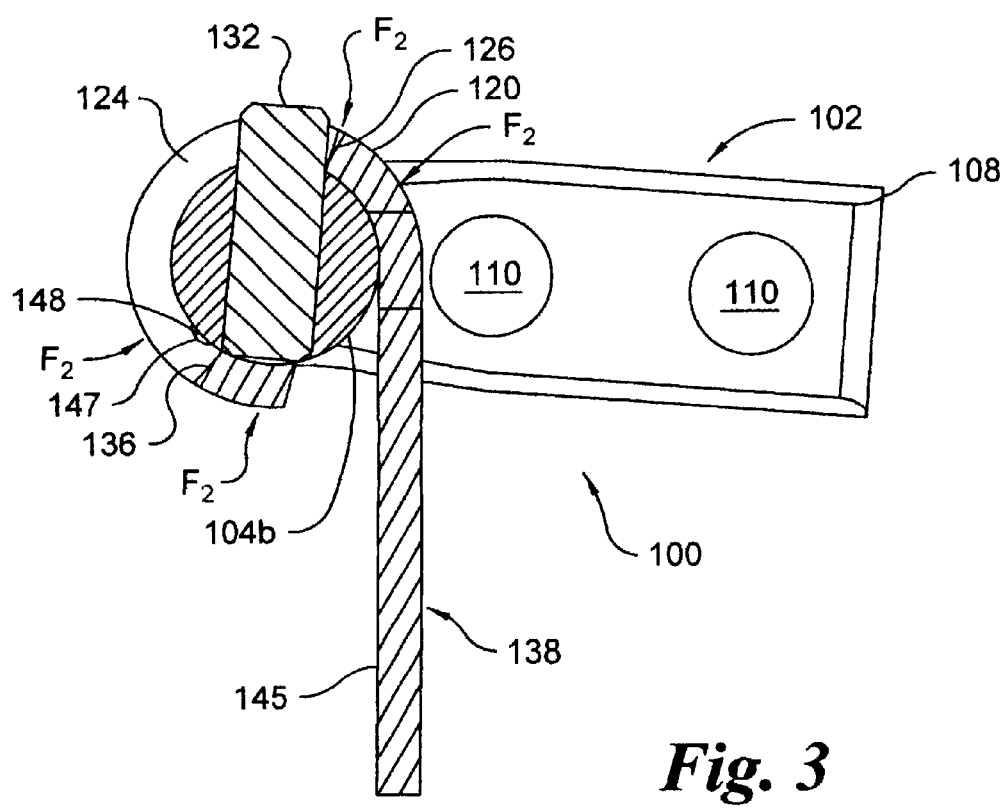
FIG. 3 is a cross-sectional view of the hinge assembly shown in FIG. 1, taken along the lines 3—3 in FIG. 2 and showing a friction member and a pintle in a first predefined angular relationship.
Figure 4:
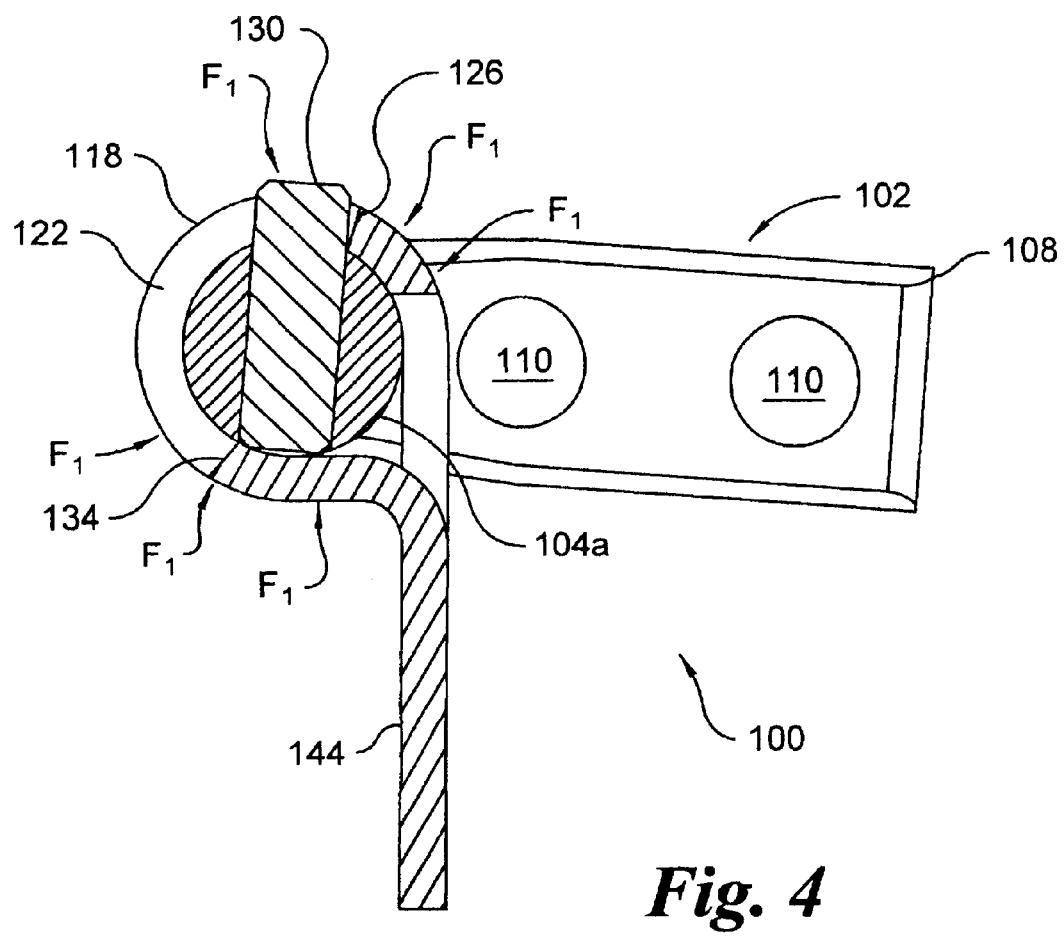
FIG. 4 is a cross-sectional view of the hinge assembly shown in FIG. 1, taken along lines 4—4 in FIG. 2 and showing the friction member and pintle in a first predefined angular relationship.

The hinge assembly 100 further includes a friction element 116 for being secured to the first member (not shown). The friction element 116 includes a first cylindrical wall 118 wrapping at least substantially circumferentially around the first longitudinal portion 104a of the pintle 102 in a first circumferential direction. The first cylindrical wall 118 is configured to provide an interference fit with the first longitudinal portion of the pintle 102 such that the first cylindrical wall 118 applies a first generally radially directed compressive force ("F1" as shown in FIG. 4) to the external surface of the pintle 102. The friction element 116 preferably further includes a second cylindrical wall 120 wrapping at least substantially circumferentially around the second longitudinal portion 104b of the pintle 102 in a second circumferential direction. Preferably, as best shown in FIGS. 1–4, the second circumferential direction is opposed to the first circumferential direction. The friction member 116 is rotatable about the pintle 102 in a first rotational direction and a second rotational direction, i.e., in either circumferential direction with respect to the first and second longitudinal portions 104a, b of the pintle 102. The second cylindrical wall 120 is, similar to the first cylindrical wall 118, configured to provide an interference fit with the second longitudinal portion 104b of the pintle 102 such that the second cylindrical wall 120 applies a second generally radially directed compressive force ("F2" in FIG. 3) to the second longitudinal portion 104b of the pintle 102. The compressive forces F1, F2 preferably provide torque transfer between the friction element 116 and pintle 102 and angular position control of the pintle 102 with respect to the friction element 116. The friction element 116 preferably is made from spring steel, although other resilient materials may be used.

The first and second cylindrical walls 118, 120 preferably include first and second longitudinal grooves 146, 147 therein for retaining a lubricant 148 and for relieving excessive pressure from the trailing end of the friction element as described in U.S. Pat. No. 5,491,874, thus greatly increasing the life of the hinge assembly 100. Further, it is contemplated that any number of longitudinal grooves 146, 147 may be incorporated, also as described in U.S. Pat. No. 5,491,874.

Figure 5:
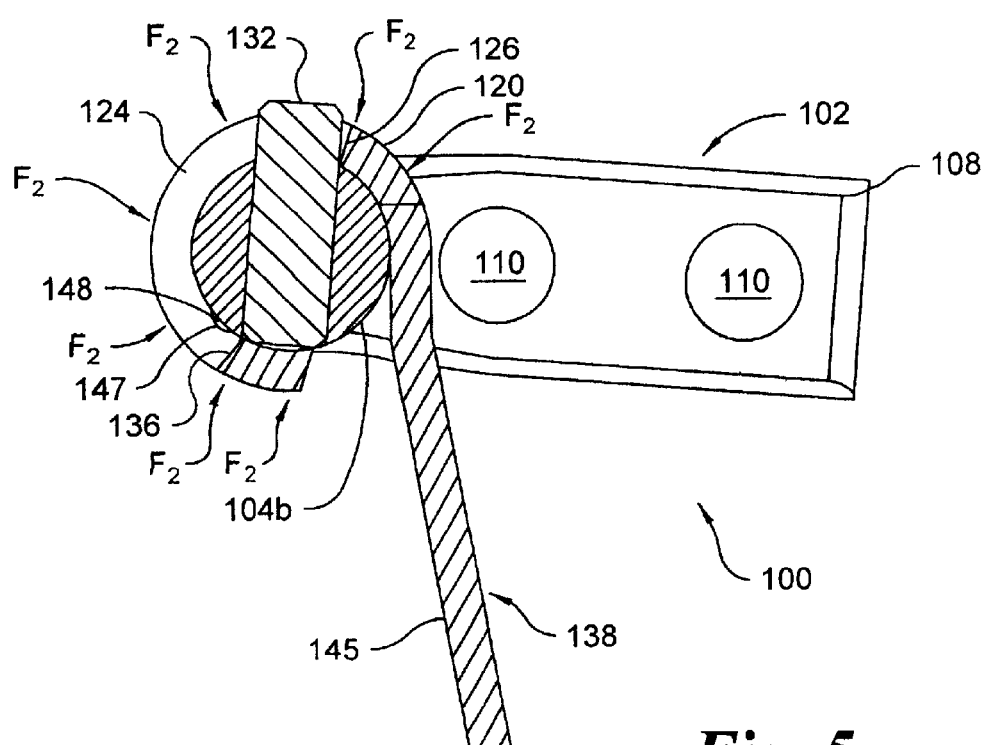
FIG. 5 is a cross-sectional view of the hinge assembly shown in FIG. 1, taken along lines 3—3 in FIG. 2 and showing the friction member and pintle in a second predefined angular relationship.
Figure 6:
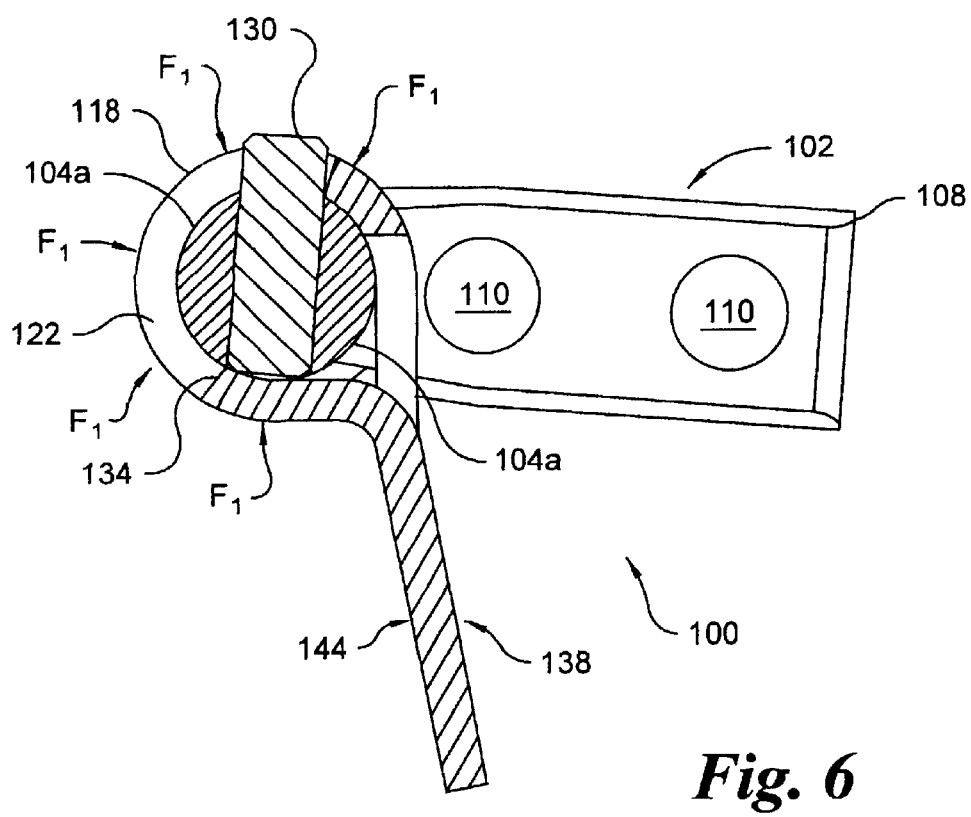
FIG. 6 is a cross-sectional view of the hinge assembly shown in FIG. 1, taken along line 4—4 in FIG. 2 and showing the friction member and pintle in a second predefined angular relationship.

The friction element 116 preferably further includes a torque arm 138 for being attached to the first member and extending from the first and second cylindrical walls 118, 120. The torque arm 138 preferably includes a plurality of holes 139 for attachment to the first member with fasteners (not shown). Preferably the torque arm 138 includes first and second sections 140, 142, respectively, each of the first and second sections 140, 142 preferably being unitary with the first cylindrical wall 118 and second cylindrical wall 120, respectively. Alternatively, it is contemplated that the torque arm 138, including both first and second sections, 140, 142, also be unitary, thus uniting the entire friction element 116. As best shown in FIGS. 3 and 4, the torque arm 138 preferably includes a planar surface 144 extending at a tangent from the external surface 104 of the pintle 102. Those skilled in the art will recognize having read this disclosure that the planar surface 144 of the torque arm 138 may extend from the external surface 104 of the pintle 102 at virtually any angle, depending on the constraints of a given application. The torque arm 138 preferably is sufficiently long to accommodate mounting features in the form of holes 139 in the preferred embodiment, and to accommodate a certain amount of bend along its length, as shown in FIGS. 5 and 6 and as will be discussed more fully below. Due to this bending, the purpose of which will be discussed below, the torque arm 138, like the friction element 116, preferably is made from a resilient material such as spring steel so as to permit the torque arm 138 to bend to a certain degree without breaking or fatiguing after many bending cycles. Other materials that may be used include relatively rigid yet tough polymeric materials, including reinforced polymeric materials.

Resistance to rotation varies depending on the direction of the circumferential wrap with respect to the direction of rotation. More specifically, resistance to rotation of the pintle 102 with respect to the friction element 116 is greater in the rotational direction of the circumferential wrap than it is in the rotational direction opposite the circumferential wrap, as described in U.S. Pat. Nos. 5,491,874 and 5,762,293 (both incorporated herein by reference). The hinge assembly 100 includes first and second cylindrical walls 118, 120 that wrap at least substantially circumferentially around the pintle in opposing first and second directions, respectively, to provide equal resistance to relative rotation therebetween in both directions.

As best shown in FIGS. 3–9, the first and second cylindrical walls 118, 120 preferably include first and second circumferential slots 122, 124, respectively, therein. It should be understood that, alternatively, only one of the first and second cylindrical walls 118, 120 need have a circumferential slot 122, 124, therein. The first circumferential slot 122 includes at least a first end 126 and the second circumferential slot 124 also includes at least a first end 128. The hinge assembly 100 further includes a first protuberance 130 extending generally radially outwardly from the first longitudinal portion 104a of the pintle 102 and into the first circumferential slot 122 and a second protuberance 132 extending generally radially outwardly from the second longitudinal portion 104b of the pintle 102 and into the second circumferential slot 124. The first and second protuberances 130, 132 preferably are circumferentially congruous with respect to the pintle 102, i.e., the first and second protuberances 130, 132 are positioned on the first and second longitudinal positions 104a, b, respectively, at equal circumferential positions with respect to, for example, the mounting tab 108. Alternatively, the protuberances 130, 132 may be positioned at circumferentially incongruous locations with respect to the pintle 102. Further, as described above, the first and second protuberances 130, 132 preferably are pins extending from holes (not shown) in the pintle 102, although those skilled in the art will recognize that other well known structural components that provide for protuberances rising from the surface of the pintle 102 may be used without departing from the scope and spirit of the invention. Thus, the protuberances 130, 132 need not be pins, but could be virtually any other structure that permits rotation of the pintle 102 vis-à-vis the friction element 116 to be impeded by contact between a structure on the pintle 102 and a portion of the friction element 116. For example, one or both of the outboard ends of the first and second cylindrical walls 118, 120 could include a structure (not shown) that could be engaged by a structure (not shown) on the pintle 102, external to or outboard of the illustrated intersecting region of the pintle 102 and friction element 116.

As best shown in FIGS. 3 and 4, the first and second protuberances 130, 132 engage the first ends 126, 128 when the first member and second member achieve a first predefined angular relationship with respect to one another. Preferably, the first predefined angular relationship corresponds to an intermediate position wherein the first and second members are in a partially open position with respect to one another, preferably at an angle of approximately 5 degrees, although greater or lesser angles are contemplated. Movement beyond the first predefined angular relationship to a second predefined angular relationship between the first and second members (shown in FIGS. 5 and 6) causes deflection in the friction member 116 and torque arm 138 (best shown by a comparison of FIGS. 5 and 6 to FIGS. 3 and 4, respectively), whereby the first and second members are urged toward the first predefined angular relationship with a predetermined force. Preferably, the second predefined angular relationship corresponds to the "closed" position of the first and second members, i.e., the first and second members are in a face-to-face mating relationship. In this position the hinge assembly 100 is storing energy in the form of a deflection in the friction element 116 and/or the torque arm 138. When a user releases a latch (not shown) holding the first and second members in the closed position, the first and second members spring apart to approximately the first predefined angular relationship. Those skilled in the art will recognize that with respect to laptop-type devices, the mass and configuration of the first member will affect the amount of "pop-up." Preferably, as the hinge assembly 100 is moved from the first predefined angular relationship (FIGS. 3 and 4) to the second predefined angular relationship (FIGS. 5 and 6), at least a portion of the deflection occurs in the torque arm 138, most concentrated in the general region where the torque arm 138 meets the first and second cylindrical walls 118, 120. The angular amount of spring-back caused by pre-loading the hinge assembly 100 as discussed above (including deflection in the torque arm 138) may be slightly greater than the angular difference between the first and second predefined angular relationship. It is important in configuring the hinge assembly 100 and in particular in selecting materials that the amount of pre-load be taken into account. One must remain safely within the yield limits of the selected material, and must avoid prematurely fatiguing the friction member 116 and torque member 138. Methods to select an appropriate material for the friction member 12 and to design the hinge assembly with appropriate levels of pre-load are well known to those of those skilled in the art.

The predetermined force urging the first and second members from the second predefined angular relationship toward the first predefined angular relationship preferably is sufficient to cause a "pop-open" or "pop-up" effect between the first and second members such that upon releasing a latch or the like that maintains the first and second members in the "closed" position (the second predefined angular relationship), the first and second members spring open. Preferably the pop-up effect is sufficient to bring the first and second members to a point where a user may easily grasp one or both of the first and second members for fully opening the clamshell device. The degree of predetermined force may be varied by varying the thickness of material used to make the torque arm 138, by varying the material used, or by varying the angular differential between the first predefined angular relationship and the second predefined angular relationship. The greater the angular differential, the greater the pop-up effect.

Figure 7:
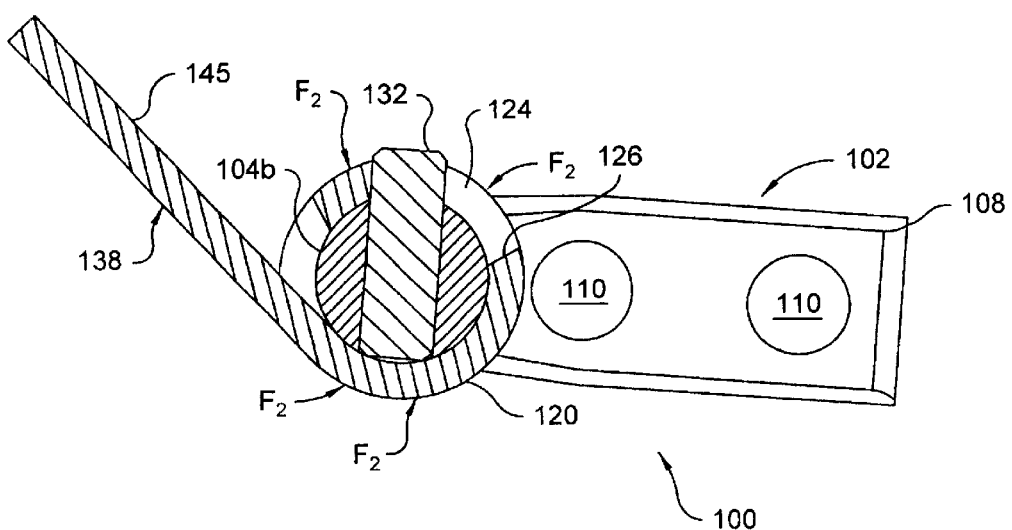
FIG. 7 is a cross-sectional view of the hinge assembly shown in FIG. 1, taken along lines 3—3 in FIG. 2 and showing the friction member and pintle in a third predefined angular relationship.
Figure 8:
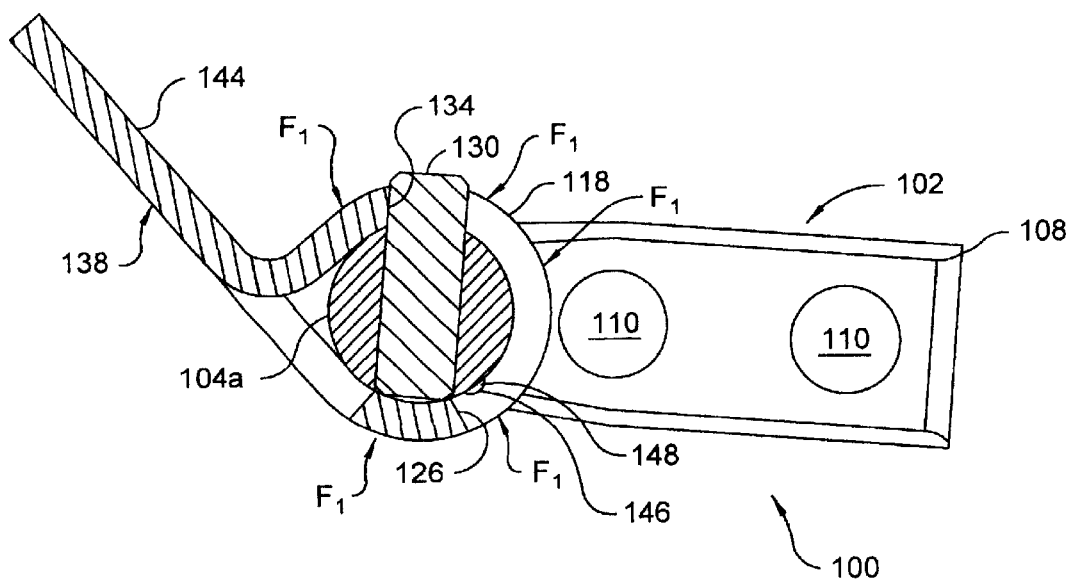
FIG. 8 is a cross-sectional view of the hinge assembly shown in FIG. 1, taken along lines 4—4 in FIG. 2 and showing the friction member and pintle in a third predefined angular relationship.

Referring to FIGS. 3–8, the first and second circumferential slots 122, 124 preferably each include a second end 134, 136, respectively. As shown in FIGS. 7 and 8, the first and second protuberances 130, 132 preferably engage the second ends 134, 136 of the first and second circumferential slots 122, 124 at a third predefined angular relationship between the first and second members. Preferably, the third predefined angular relationship corresponds to an "open" position wherein the first and second members are in an operational position with respect to one another. In the preferred embodiment, the third predefined angular relationship corresponds to 137° between the first and second members, but other angular relationships are contemplated depending on the nature of the device into which the hinge assembly 100 is installed. For example, in the case of a laptop computer, the display (one of the first and second members) would be in a viewable state in the third predefined angular relationship.

Figure 9:
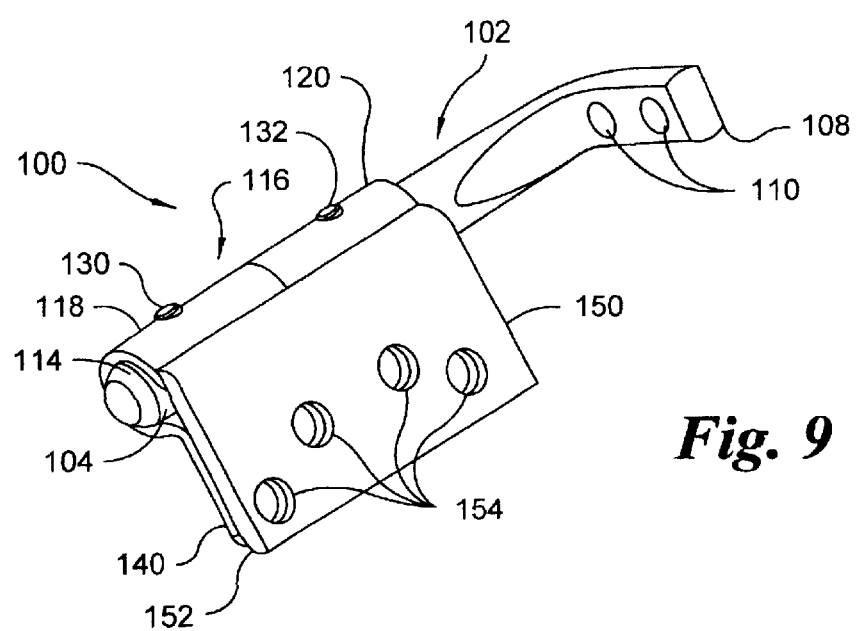
FIG. 9 is perspective view of the hinge assembly of FIG. 1, showing a reinforcing plate attached thereto.

Referring now to FIG. 9, a mechanism for increasing the predetermined force and, accordingly, the pop-up effect is shown. The hinge assembly 100 preferably includes a reinforcing plate 150 for decreasing deflection in the torque arm 138. The reinforcing plate 150 includes a first side 152 in contact with the torque arm 138. The reinforcing plate 150 preferably sits closely against a portion of the friction element 116 torque arm 138 that would deflect as a result of movement from the first predefined angular relationship (FIGS. 3, 4) to the second predefined angular relationship (FIGS. 5, 6). As shown in FIG. 9, the reinforcing plate 150 contacts the torque arm 138 and a portion of the first and second cylindrical walls 118, 120. However, it is contemplated that the reinforcing plate 150 could be in contact with the torque arm 138 and not the first and second cylindrical walls 118, 120. It is also contemplated that the reinforcing plate 150 may be unitary with the friction element 116 such that a portion of the friction element 116 is thicker, thus acting as a reinforcing plate. In such a configuration, the thickened portion of the friction element 116 could include only the torque arm 138 or could extend to a certain degree into the first and/or second cylindrical walls 118, 120. In its assembled state, the reinforcing plate 150 preferably is fastened to the torque arm 138 via holes 154 that correspond to holes 139 in the torque arm 138.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A hinge assembly for rotatably coupling a first member to a second member, the assembly comprising:
   a pintle for being secured to the second member, the pintle having a cylindrical external surface, the external surface having a first longitudinal portion and a second longitudinal portion;
   a friction element for being secured to the first member, the friction element including a first cylindrical wall wrapping at least substantially circumferentially around the first longitudinal portion of the pintle in a first circumferential direction, the first cylindrical wall being configured to provide an interference fit with the pintle, the friction element further including a second cylindrical wall wrapping at least substantially circumferentially around the second longitudinal portion of the pintle in a second circumferential direction, the second circumferential direction being opposed to the first circumferential direction, the second cylindrical wall being configured to provide an interference fit with the pintle, at least one of the first and second cylindrical walls including a first circumferential slot therein, the first circumferential slot having at least a first end; and
   a first protuberance extending generally radially outwardly from the pintle and into the first circumferential slot, the protuberance engaging the first end when the first member and second member achieve a first predefined angular relationship with respect to one another corresponding to a partially open position, movement beyond the first predefined angular relationship to a second predefined angular relationship between the first and second members corresponding to a closed position causing deflection in the friction member whereby the first and second members are urged toward the first predefined angular relationship with a predetermined force.

2. The hinge assembly of claim 1 wherein the friction element includes a torque arm extending from at least one of the first and second cylindrical walls, the torque arm for being attached to the first member, at least a portion of the deflection occurring in the torque arm.

3. The hinge assembly of claim 2 wherein the torque arm includes a planar surface, at least a portion of the planar surface extending parallel to a tangent of the external surface of the pintle.

4. The hinge assembly of claim 1 wherein a first generally radially directed compressive force is developed between the first cylindrical wall and the pintle and a second generally radially directed compressive force is developed between the second cylindrical wall and the pintle and wherein the first and second compressive forces provide torque transfer and angular positional control of the pintle with respect to the friction element.

5. The hinge assembly of claim 1 wherein the friction member is rotatable about the pintle in a first rotational direction and a second rotational direction, rotation of the friction member about the pintle requiring equal force in the first rotational direction and the second rotational direction.

6. The hinge assembly of claim 1 wherein the first circumferential slot further includes a second end, the protuberance engaging the second end of the slot at a third predefined angular relationship between the first and second members.

7. The hinge assembly of claim 1 further including a second circumferential slot in the other of the first and second cylindrical walls, the second circumferential slot having a first end and a second end, the hinge assembly further including a second protuberance extending generally radially outwardly from the pintle and into the second circumferential slot, the second protuberance engaging the first end of the second circumferential slot when the first and second members achieve the first predefined angular relationship with respect to one another, the second protuberance engaging the second end of the second circumferential slot when the first and second members achieve the third predefined angular relationship.

8. The hinge assembly of claim 7 wherein the friction member is rotatable about the pintle in a first rotational direction and a second rotational direction, rotation of the friction member about the pintle requiring equal force in the first rotational direction and the second rotational direction.

9. The hinge assembly of claim 7 wherein the first and second protuberances are in circumferentially corresponding positions with one another.

10. The hinge assembly of claim 9 further including a reinforcing plate for decreasing the deflection in the torque arm, the reinforcing plate having a first side being in contact with the torque arm.

* * * * *